US012567210B2

(12) United States Patent
Tenkasi Shankar

(10) Patent No.: US 12,567,210 B2
(45) Date of Patent: Mar. 3, 2026

(54) MULTIPATH ARTIFACT AVOIDANCE IN MOBILE DIMENSIONING

(71) Applicant: ZEBRA TECHNOLOGIES CORPORATION, Lincolnshire, IL (US)

(72) Inventor: Raghavendra Tenkasi Shankar, Manorville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 152 days.

(21) Appl. No.: 18/141,015

(22) Filed: Apr. 28, 2023

(65) Prior Publication Data

US 2024/0362864 A1 Oct. 31, 2024

(51) Int. Cl.
*G06T 19/00* (2011.01)
*G06T 7/70* (2017.01)
*G06V 10/74* (2022.01)

(52) U.S. Cl.
CPC ................ *G06T 19/00* (2013.01); *G06T 7/70* (2017.01); *G06V 10/761* (2022.01); *G06T 2219/012* (2013.01)

(58) Field of Classification Search
None
See application file for complete search history.

(56) References Cited

U.S. PATENT DOCUMENTS

| | | | |
|---|---|---|---|
| 11,701,007 B2 * | 7/2023 | Hanson | G08B 21/0211 |
| | | | 600/301 |
| 2017/0372527 A1 | 12/2017 | Murali et al. | |
| 2021/0385374 A1 | 12/2021 | Giordano et al. | |
| 2021/0405200 A1 | 12/2021 | Ding et al. | |
| 2023/0012241 A1 | 1/2023 | Kolesov et al. | |
| 2023/0025659 A1 | 1/2023 | Thrimawithana | |
| 2023/0306626 A1 * | 9/2023 | Cho | H04N 23/634 |

OTHER PUBLICATIONS

PCT/US 24/26379—International Search Rpeort, USPTO ISA/US, Aug. 7, 2024.
PCT/US 24/26379—Written Opinion of the International Searching Authority (ISA), USPTO ISA/US, Aug. 7, 2024.

* cited by examiner

*Primary Examiner* — Saptarshi Mazumder

(57) ABSTRACT

A method in a computing device includes: capturing, via a depth sensor, a first point cloud depicting an object; determining, from the first point cloud, a first attribute of a plane corresponding to a surface of the object; monitoring, via a motion sensor, an orientation of the depth sensor; in response to detecting a change in the orientation that meets a threshold, capturing a second point cloud depicting the object; determining, from the second point cloud, a second attribute of the plane corresponding to the surface of the object; determining whether the first attribute and the second attribute match; and when the first attribute and the second attribute match, dimensioning the object based on at least one of the first point cloud and the second point cloud.

18 Claims, 8 Drawing Sheets

100

400

| 405 Initiate data capture |

| 410 Determine plane attribute |

| 415 Prompt to re-orient device |

420 New orientation?

No

Yes

| 425 Determine N$^{th}$ plane attribute |

430 N matches N-1?

No

Yes

| 435 Determine, present dimensions |

MULTIPATH ARTIFACT AVOIDANCE IN MOBILE DIMENSIONING

BACKGROUND

Depth sensors such as time-of-flight (ToF) sensors can be deployed in mobile devices such as handheld computers, and employed to capture point clouds of objects (e.g., boxes or other packages), from which object dimensions can be derived. Point clouds generated by ToF sensors, however, may contain artifacts induced by multipath reflections received at the sensor, which can affect the accuracy of dimensions determined from the point clouds.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
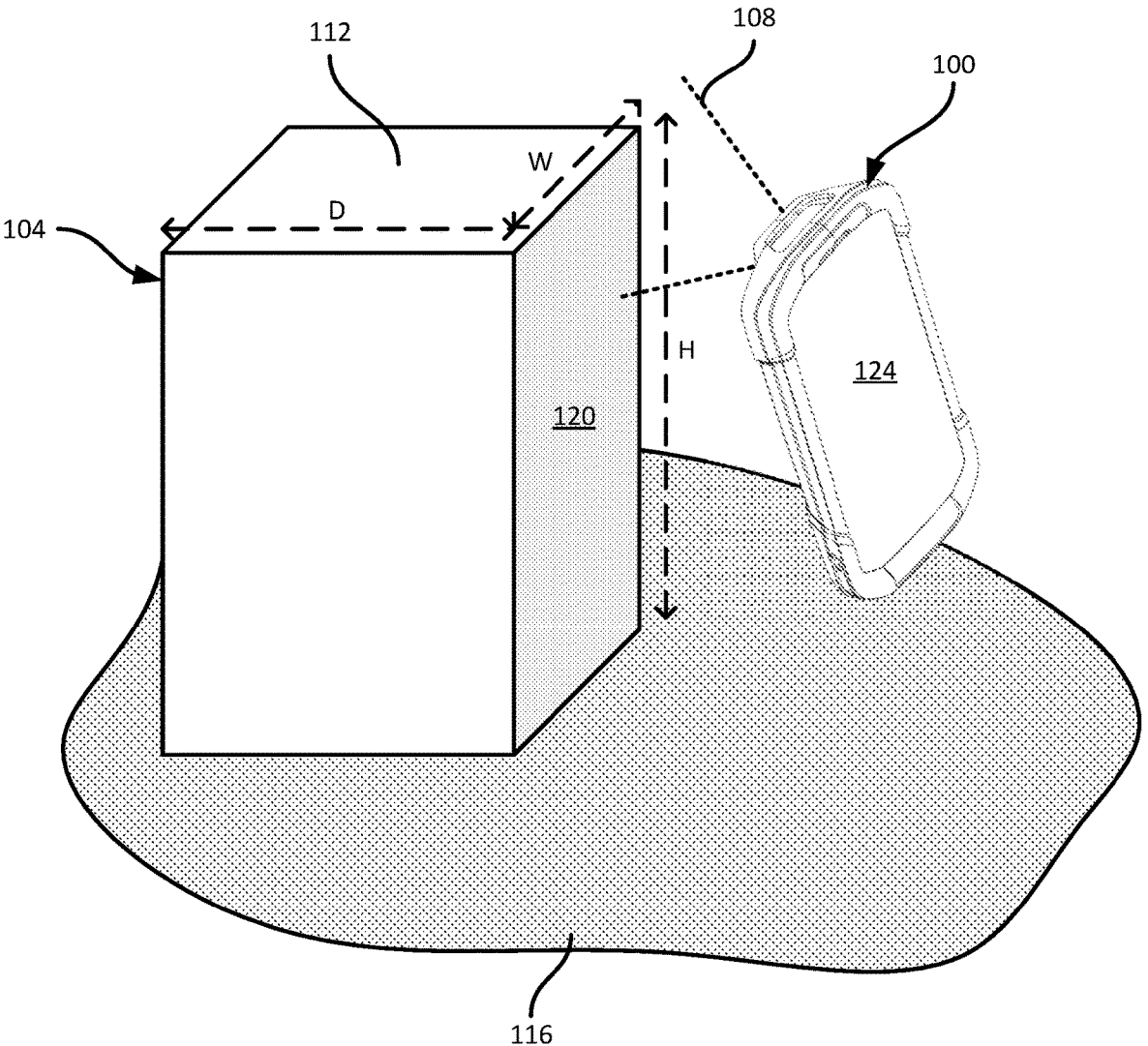
FIG. 1 is a diagram illustrating a mobile computing device to dimension an object.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a computing device including: capturing, via a depth sensor, a first point cloud depicting an object; determining, from the first point cloud, a first attribute of a plane corresponding to a surface of the object; monitoring, via a motion sensor, an orientation of the depth sensor; in response to detecting a change in the orientation that meets a threshold, capturing a second point cloud depicting the object; determining, from the second point cloud, a second attribute of the plane corresponding to the surface of the object; determining whether the first attribute and the second attribute match;

and when the first attribute and the second attribute match, dimensioning the object based on at least one of the first point cloud and the second point cloud.

Additional examples disclosed herein are directed to a computing device, comprising: a motion sensor; a depth sensor; and a processor configured to: capture, via the depth sensor, a first point cloud depicting an object; determine, from the first point cloud, a first attribute of a plane corresponding to a surface of the object; monitor, via the motion sensor, an orientation of the computing device; in response to detecting a change in the orientation that meets a threshold, capturing a second point cloud depicting the object; determine, from the second point cloud, a second attribute of the plane corresponding to the surface of the object; determine whether the first attribute and the second attribute match; and when the first attribute and the second attribute match, dimension the object based on at least one of the first point cloud and the second point cloud.

FIG. 1 illustrates a mobile computing device 100 (also referred to herein as the mobile device 100 or simply the device 100) that is enabled to capture point clouds (including depth maps, depth images including color data, or the like) and determine dimensions of objects represented in the point clouds. For example the device 100 can be operated to capture a point cloud representing an object 104 within a field of view 108 of a depth sensor of the device 100. The depth sensor can include a time-of-flight (ToF) sensor, for example.

The object 104 can be a package or collection of packages (e.g., on a pallet) in a transport and logistics facility, for example. From a captured point cloud, the device 100 can be configured to detect an upper surface 112 (e.g., a planar surface, in this example) of the object 104. The device 100 can also be configured to detect a reference surface 116, such as a floor, a ramp, a shelf, or another support surface on which the object 104 rests.

The device 100 can determine dimensions of the object 104 by detecting dimensions of the upper surface 112, such as a width "W" and a depth "D", and by detecting a height "H" as the distance between the upper surface 112 and the reference surface 116. In other examples, the height H can be determined from a side 120 of the object 104 detected from the captured point cloud instead of, or in addition to, a difference between the position of the upper surface 112 and the reference surface 116.

The dimensions of the object 104 generated by the device 100 can be presented on a display 124 of the device 100, and/or transmitted to another computing device (including multiple other computing devices). The dimensions can be employed by the device 100 or such other device(s) to optimize the use of space in a container used to ship the object 104, to determine a shipping cost for the object 104, and the like.

Certain depth sensors, including ToF sensors, include an emitter (e.g., a laser diode or the like) to illuminate a scene (e.g., illuminating the entire scene simultaneously), and an array of pixels configured to capture reflections from the illumination emitted by the emitter. A ToF sensor can also include a microcontroller or other suitable control circuit configured to determine a depth measurement for each pixel that captures reflected light. The depth measurement indicates the distance between the sensor and a surface in the scene that originated the reflection, and is determined based on the time elapsed between an illumination pulse and the arrival of the reflection at the sensor.

Figure 2:
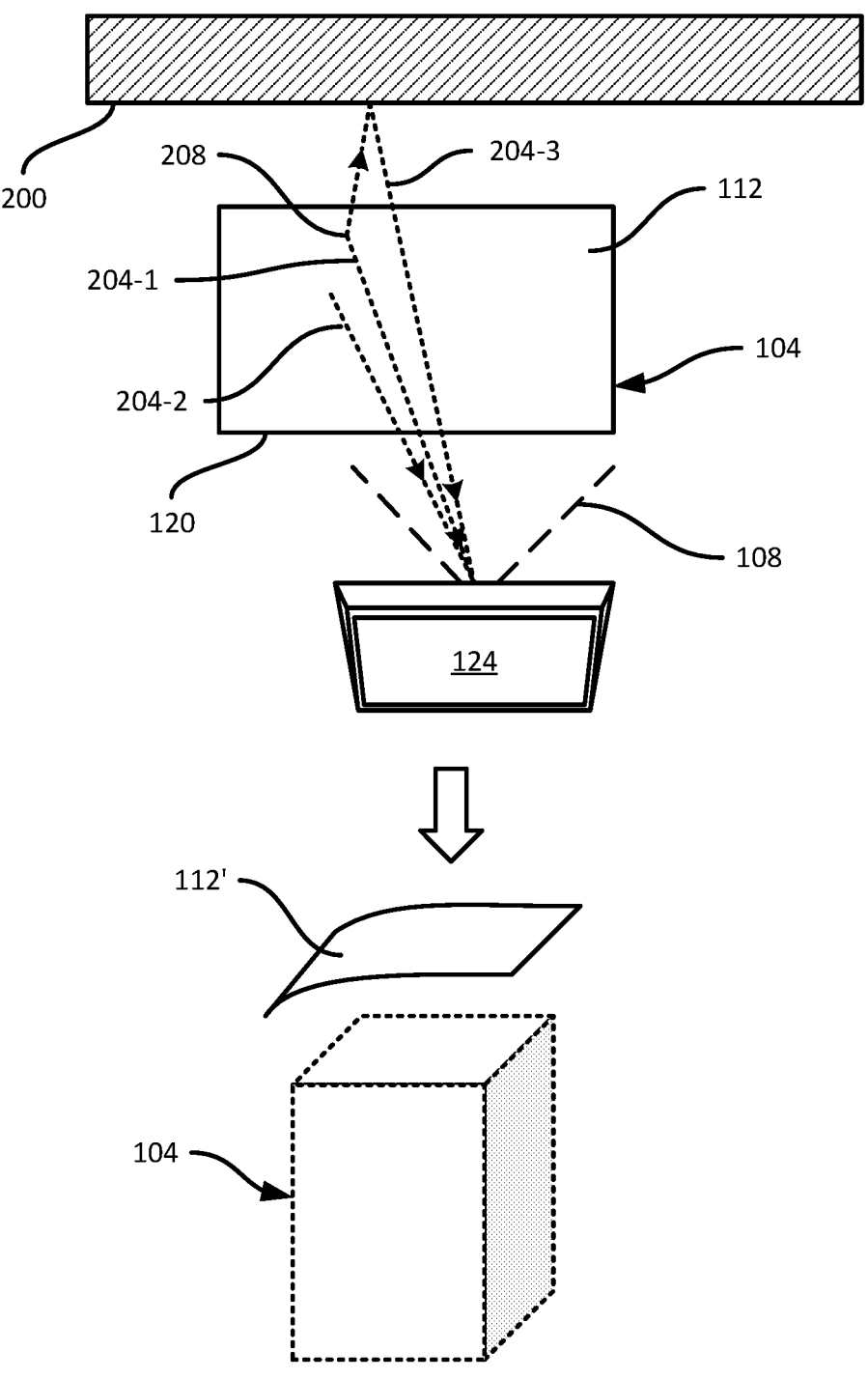
FIG. 2 is a diagram illustrating multipath artifacts in depth data captured by the mobile computing device of FIG. 1.

Determination of a depth measurement for a given pixel, however, can be complicated by multipath reflections received at the sensor. Turning to FIG. 2, an overhead view of the device 100 and the object 104 is shown, in which the object 104 is adjacent to another surface 200, such as a wall, another package, or the like. Following emission of a pulse of illumination, a single pixel of the sensor may receive three distinct reflections 204-1, 204-2, and 204-3. The reflection 204-1 may arrive at the sensor directly from a point 208 on the upper surface 112. The reflection 204-2 may arrive at the sensor directly from a different point on the upper surface 112, e.g., due to the surface texture of the surface 112. The reflection 204-3 may arrive at the sensor having first reflected from the first point 208 to the surface 200.

The sensor can therefore attempt to integrate the various reflections 204 to generate a depth measurement corresponding to the point 208. Due to the variable nature of multipath reflections, it may be difficult to accurately determine the position of the point 208 in three-dimensional space. For example, the sensor may overestimate the distance between the sensor and the point 208. The resulting point cloud, for instance, may depict an upper surface 112' that is distorted relative to the true shape of the upper surface 112 (the object 104 is shown in dashed lines below the surface 112' for comparison). The surface 112', in this exaggerated example, has a curved profile and is larger in one dimension than the true surface 112. Multipath artifacts in captured point clouds may therefore lead to inaccurate dimensions for the object 104.

The device 100 therefore implements additional functionality to mitigate the impact of multipath artifacts on dimensioning using depth sensors such as ToF sensors. The device 100 also generates dimensions as discussed above, e.g. for rendering on a display 124 of the device 100, transmission to another computing device, or the like.

Figure 3:
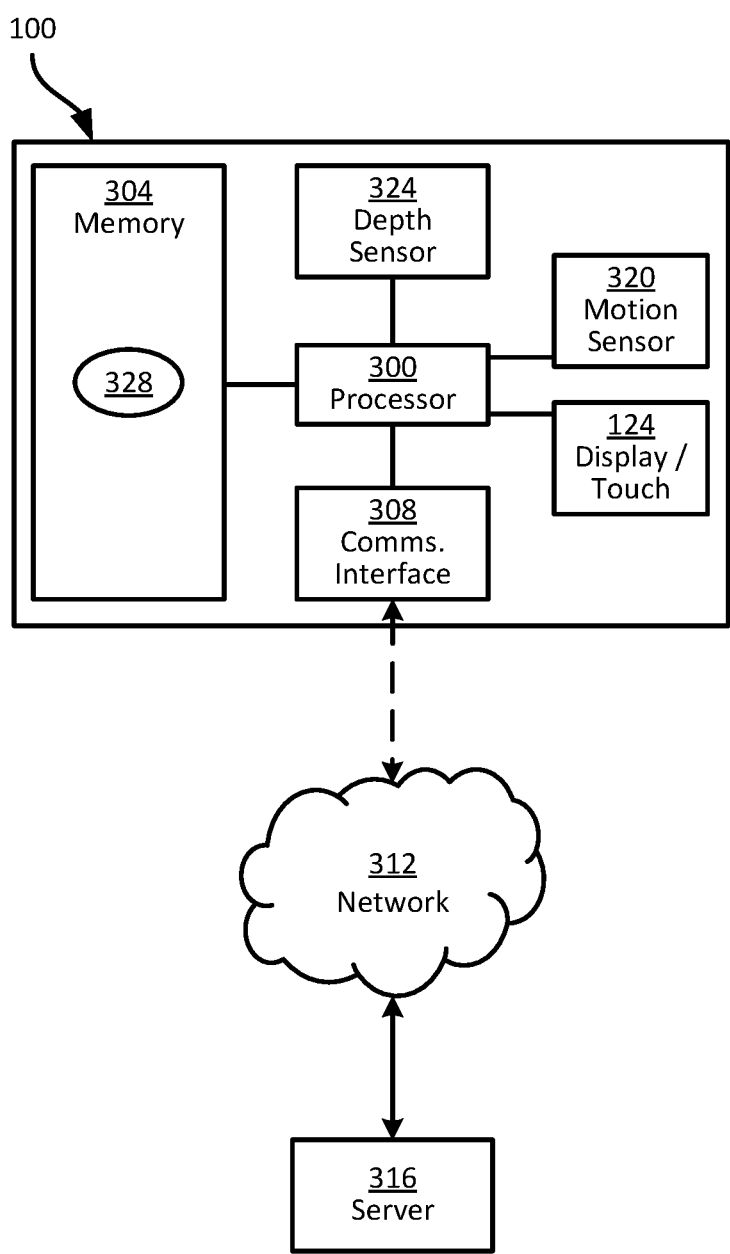
FIG. 3 is a block diagram of certain internal hardware components of the mobile computing device of FIG. 1.

Turning to FIG. 3, a block diagram of certain components of the device 100 is illustrated. In addition to the display (and integrated touch screen, in this example) 124, the device 100 includes a processor 300, such as a central processing unit (CPU), graphics processing unit (GPU), special-purpose controller such as an application-specific integrated circuit (ASIC), or the like. The processor 300 is interconnected with a non-transitory computer readable storage medium, such as a memory 304. The memory 304 includes a combination of volatile memory (e.g. Random Access Memory or RAM) and non-volatile memory (e.g. read only memory or ROM, Electrically Erasable Programmable Read Only Memory or EEPROM, flash memory). The processor 300 and the memory 304 can each comprise one or more integrated circuits, e.g., disposed on a substrate such as a printed circuit board, implemented as a system-on-chip (SoC), or the like.

The device 100 also includes a communications interface 308 enabling the device 100 to exchange data with other computing devices, e.g., via a network 312. The other computing devices can include a server 316, which may be deployed within the facility in which the device 100 is deployed. The server 316 can also be deployed remotely from the above-mentioned facility.

In addition, the device 100 includes a motion sensor 320, such as an inertial measurement unit (IMU) including a suitable combination of gyroscopes, accelerometers and the like. The motion sensor 320 is configured to provide measurements to the processor 300 defining motion and/or orientation of the device 100. For example, the motion sensor 320 can provide an orientation of the device 100 relative to a gravity vector (e.g., a vector directed towards the center of the planet).

The device 100 further includes a depth sensor 324, such as a ToF sensor as noted earlier. As discussed above, the depth sensor 324 can therefore include an emitter such as a light-emitting diode (LED), and an image sensor providing an array of pixels (e.g., a charge-coupled device (CCD) sensor, a complementary metal-oxide-semiconductor (CMOS) sensor, or the like). The sensor 324 can also include processing hardware, such as a local controller or the like, to generate point cloud data from raw reflections captured via the image sensor. In other examples, processing of raw sensor data can be performed by the processor 300. In other examples, the motion sensor 320 can be implemented by the depth sensor 324 and/or another image sensor, such as a camera, instead of or in addition to an IMU.

The memory 304 stores computer readable instructions for execution by the processor 300. In particular, the memory 304 stores a dimensioning application 328 which, when executed by the processor 300, configures the processor 300 to process successive point clouds captured via the depth sensor 324 and determine whether the point clouds are likely to be affected by multipath artifacts, before generating dimensions. By capturing further point clouds until a point cloud is captured that appears unlikely to contain multipath artifacts, the device 100 can improve the accuracy of object dimensions generated from the captured point clouds.

Figure 4:
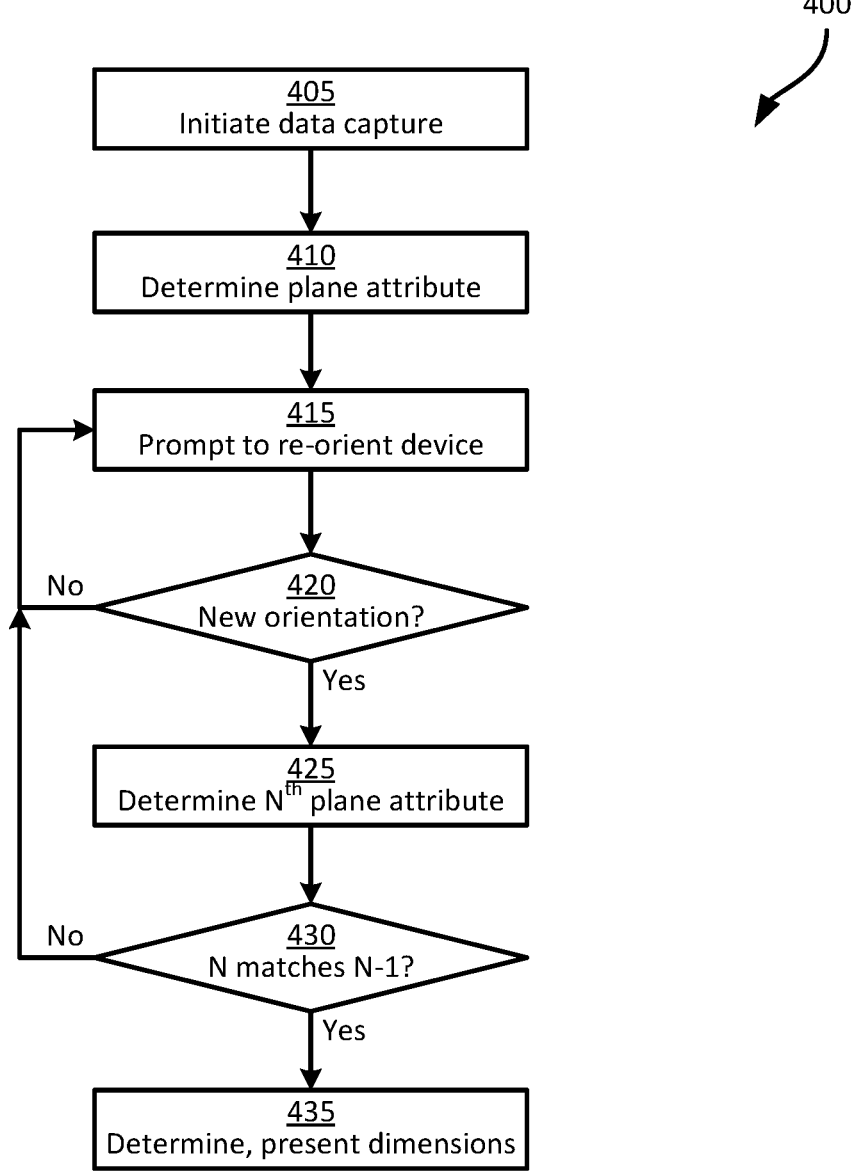
FIG. 4 is a flowchart of a method of multipath artifact avoidance in mobile dimensioning.

Referring to FIG. 4, a method 400 of multipath artifact avoidance in mobile dimensioning is illustrated. The method 400 is described below in conjunction with its performance by the device 100, although it will be understood that the method 400 can also be performed by other devices.

At block 405, the device 100 is configured (e.g., via execution of the application 328 by the processor 300) to initiate data capture via the depth sensor 324, for example in response to activation of an input of the device 100 (e.g., selection of an element on the display 124). Initiating data capture includes capturing at least one point cloud, also referred to as one frame of point cloud data. For example, in the context of a ToF sensor, each frame results from one pulse of illumination from the sensor 324, and the capture of reflections resulting from that pulse. In some examples, the initiation at block 405 includes beginning the capture of a sequence of frames at any suitable rate, e.g., at a frequency of ten frames per second (although it will be understood that lower and higher capture rates can be employed, for example depending on the dimensioning use case and/or the computational resources available at the device 100).

At block 410, the device 100 is configured, in a given frame of point cloud data captured by the sensor 324 (e.g., the first frame captured following initiation at block 405), to determine an attribute of the upper surface 112 of the object 104. For example, the device 100 can be configured to detect the upper surface 112 via any suitable segmentation algorithm. In some implementations, the device 100 performs one or more plane-fitting operations on the captured point cloud, e.g., using random sample consensus (RANSAC) and/or other suitable operations, to detect planes that correspond to one or more surfaces of the object 104. The device 100 is configured to detect the plane corresponding to the upper surface 112, e.g., by selecting the plane at the greatest height in a three-dimensional coordinate system, if multiple planes are detected from the point cloud.

The device 100 is further configured, at block 410, to determine at least one attribute of the plane corresponding to the upper surface 112. The attribute determined at block 410 can include a linear dimension, such as a width and/or a length of the plane. The attribute can also include, in addition to or instead of the linear dimensions mentioned above, an angle of orientation of the plane, e.g., relative to a three-dimensional coordinate system in which the current pose of the device 100 is tracked (e.g., by the motion sensor 320).

Figure 5:
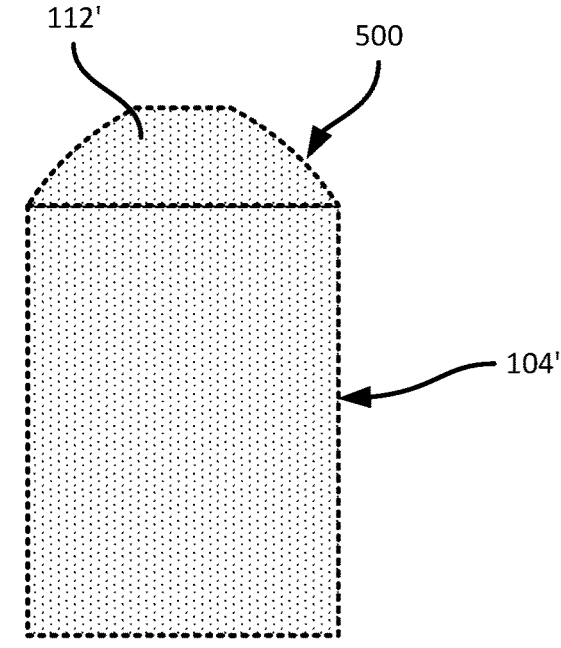
FIG. 5 is a diagram illustrating a performance of blocks 405 and 410 of the method of FIG. 4.
Figure 5:
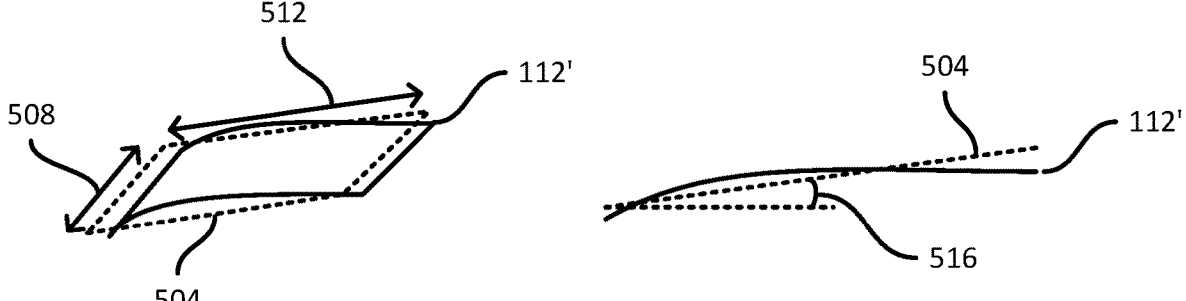

Turning to FIG. 5, an example point cloud 500 is illustrated as captured at block 405. The point cloud 500 includes a representation 104' of the object 104, including a sensed upper surface 112' that may correspond closely in shape and orientation to the true upper surface 112, or that may deviate from the true upper surface 112, e.g., due to multipath artifacts captured by the sensor 324. At block 410, the device 100 is configured to fit a plane 504 to the upper surface 112'. The plane 504 is illustrated in a perspective view and from the side, and illustrates that while the true surface 112 is flat, the sensed surface 112' is curved and elongated. The device 100 can be configured to determine one or more of a length or depth 508 of the plane 504, a width 512 of the plane 504, and an angle of orientation 516 (e.g., relative to the vertical, provided by the previously mentioned gravity vector) of the plane 504.

As will now be apparent, from the single point cloud analyzed, it may be difficult to determine whether the point cloud 500 accurately represents the object 104, as the variable nature of multipath artifacts renders such artifacts difficult to detect and eliminate. In other words, while the point cloud 500 depicts a box with a curved upper surface, it may be difficult to determine whether the object 104 itself has a curved upper surface, or whether the curved appearance of the surface 112' results from multipath artifacts. The device 100 is therefore configured to capture additional sensor data to determine whether multipath artifacts are likely to be present.

Returning to FIG. 4, at block 415, the device 100 can prompt an operator of the device 100 to change an orientation of the device 100, such that the sensor 324 is re-oriented relative to the object 104. At block 420, the device 100 is configured to monitor an orientation of the device 100 via the motion sensor 320. For example, an orientation of the device 100 relative to a gravity vector can be monitored to determine one or more of pitch, yaw, and roll angles of the device 100. A current orientation of the device 100 can be compared to the orientation of the device 100 when the point cloud 500 was captured, and the device 100 can determine whether the orientation has changed by more than a threshold amount (e.g., more than fifteen degrees, or any other suitable angular threshold). When the determination at block 420 is negative, the device 100 can be configured to continue monitoring the orientation, and repeating block 420, e.g., until a timeout is reached if no affirmative determination at block 420 occurs. Although the sensor 324 may continue capturing further point clouds while the device 100 awaits a sufficient change in orientation, the further point clouds need not be processed to detect planes of the object 104 and determine attributes of the plane corresponding to the upper surface 112. The computational load imposed on the sensor 324 and/or the processor 300 may therefore be reduced while awaiting a change in orientation.

Figure 6:
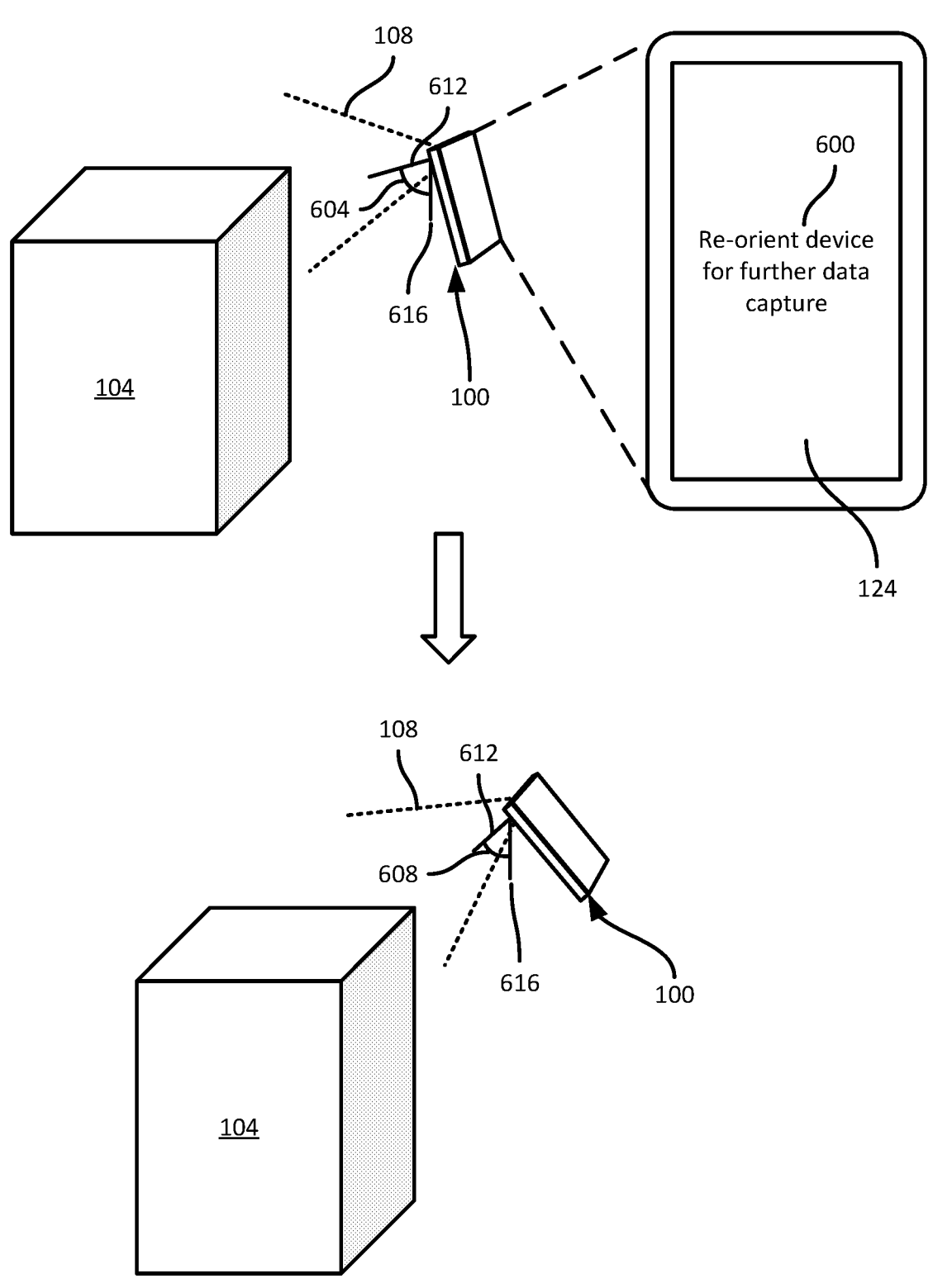
FIG. 6 is a diagram illustrating an example performance of block 415 of the method of FIG. 4.

When the determination at block 420 is affirmative, the device 100 is configured to proceed to block 425. FIG. 6 illustrates an example performance of blocks 415 and 420, in which the processor 300 controls the display 124 to present a prompt 600 instructing an operator of the device 100 to re-orient the device 100. The operator, in response to the prompt 600, may re-position the device 100 as shown in the lower portion of FIG. 6, such that a difference between an initial angle of orientation 604 and a current angle of orientation 608 (e.g., illustrated as an angle between an optical axis 612 of the sensor 324 and a gravity vector 616 monitored by the motion sensor 320) exceeds a threshold.

When the angle of orientation of the device 104 has changed sufficiently from the initial orientation at which the point cloud 500 was captured, multipath artifacts may be less likely to be present. For example, the prompt 600 can instruct the operator to place the device 100 closer to an overhead position relative to the object 104. In other examples, a change in orientation of the device 100 may remove a reflective surface behind the object 104 from the field of view 108, thus reducing the likelihood of multipath artifacts in subsequently captured point clouds.

Figure 7:
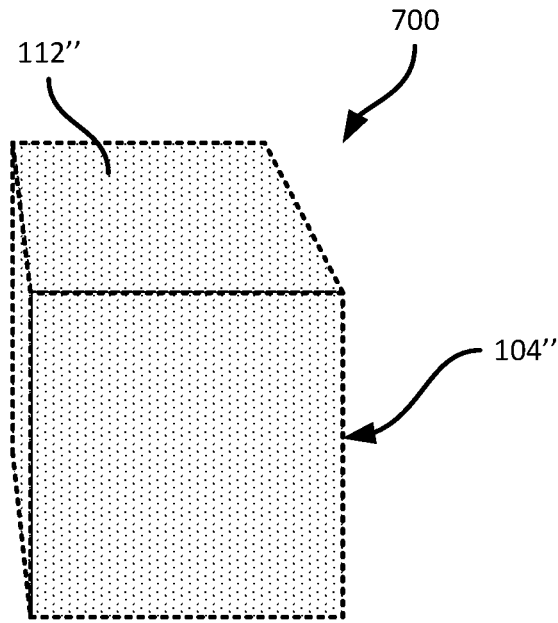
FIG. 7 is a diagram illustrating a example performance of block 425 of the method of FIG. 4.
Figure 7:
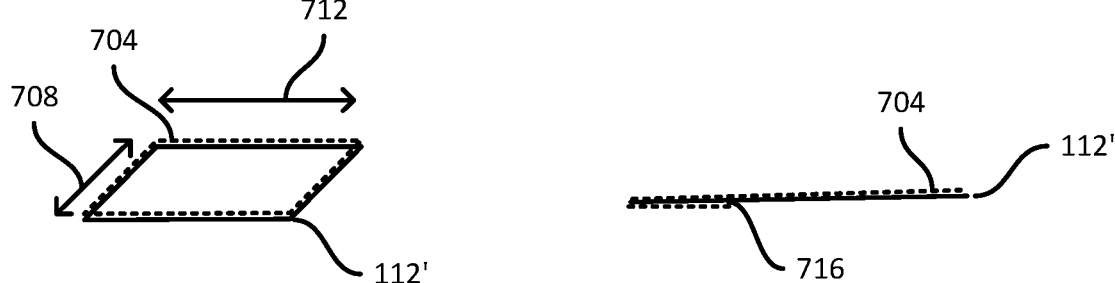

At block 425, following re-orientation of the device 100, the device 100 is configured to process another point cloud (e.g., by controlling the sensor 324 to capture a further point cloud, or by retrieving the most recent point cloud from the sequence being captured by the sensor 324). The device 100 is further configured, as described in connection with block 410, to detect one or more planes in the point cloud, to select the plane corresponding to the upper surface 112 of the object 104, and to determine second instances of the attribute(s) determined at block 410. Turning to FIG. 7, a further example point cloud 700 is illustrated, e.g., captured from the second orientation shown in FIG. 6. The device 100 is configured to determine a plane 704 corresponding to a surface 112" of the point cloud 700, and to determine one or more attributes of the plane 704, such as a length 708, a width 712, and an angle of orientation 716.

At block 430, the device 100 is configured to determine whether at least one of the attributes from block 425 matches a corresponding attribute from the previous sample. For example, in this performance of the method 400, the device 100 is configured to determine whether at least one of the attributes 708, 712, and 716 match the attributes 508, 512, and 516, respectively. The device 100 can, for example, be configured to determine whether a difference between corresponding attributes (e.g., the widths 512 and 712) is smaller than a threshold (e.g., a percentage of the width 512, an absolute amount, or the like).

When the determination at block 430 is negative, indicating that the sensed surface 112' differs significantly from the sensed surface 112" (despite both sensed surfaces corresponding to the same real surface), the device 100 is configured to return to block 415. Differences between attributes of successive detected planes corresponding to the same physical surface indicates the likely presence of multipath artifacts, and the device 100 is therefore configured to capture further data.

Figure 8:
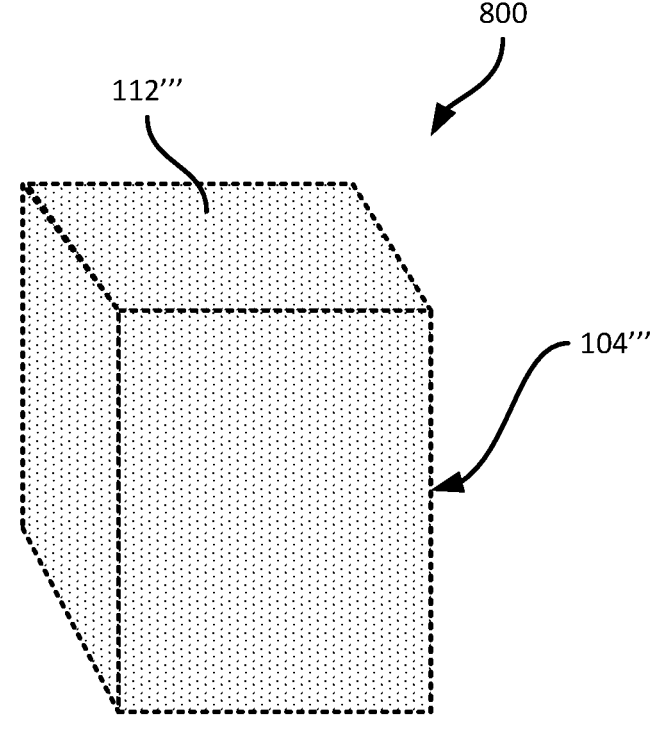
FIG. 8 is a diagram illustrating another example performance of block 425 of the method of FIG. 4.
Figure 8:
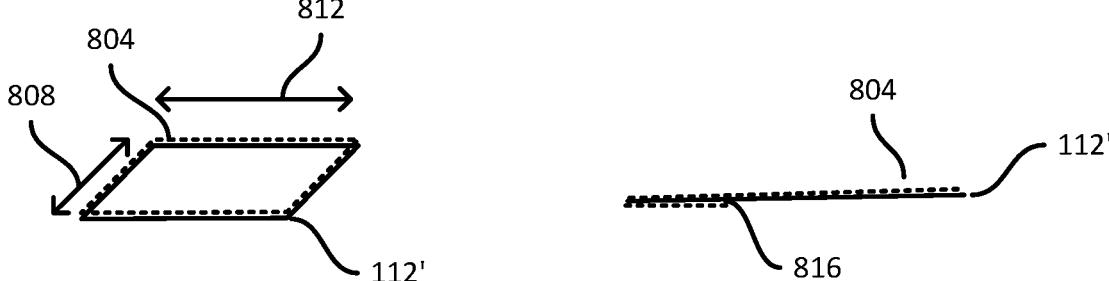

Via further performances of blocks 415, 420, and 425, the device 100 is configured to capture a further frame, e.g., defining another point cloud 800 as shown in FIG. 8. From the point cloud 800, which contains a further representation 104''' of the object 104, and a further representation 112''' of the upper surface 112, the device 100 is configured to detect a plane 804 corresponding to the upper surface 112, and to determine attributes of the plane 804 such as a length 808, a width 812, and an angle of orientation 816. At block 430, the device 100 is configured to determine whether one or more of the attributes 808, 812, and 816 match the corresponding attributes 708, 712, and 716 (that is, the attributes from the previous performance of block 425, rather than the attributes from the initial point cloud 500). In this case, the determination at block 430 is affirmative, and the device 100 therefore proceeds to block 435. When the determination at block 430 remains negative, the device 100 can continue to collect sensor data in the form of further point clouds corresponding to further device orientations, until successive point clouds are captured with sufficiently similar attributes.

At block 435, the device 100 is configured to determine one or more dimensions of the object 104, e.g., based on either or both of the point clouds 700 and 800. More generally, the device 100 is configured to generate object dimensions from a point cloud that is unlikely to contain multipath artifacts, based on the assessment performed at block 430. In the present example, the device 100 can determine the dimensions of the object 104 from the point cloud 800, e.g., including the height H, width W, and depth D as shown in FIG. 1. The dimensions can be presented on the display 124 and/or transmitted to another computing device via the network 312.

In some examples, the device 100 can be configured to apply a timeout period to the performance of the method 400, e.g., and terminate the method 400 if no affirmative determination at block 430 occurs during the time period (e.g., thirty seconds). If the timeout period expires without an affirmative determination at block 430, the device 100 can terminate the dimensioning attempt, and can also present an error notification, e.g., on the display 124, indicating that dimensioning was unsuccessful.

In further examples, at block 435 the device 100 can be configured to apply adjusted plane detection parameters relative to those applied at blocks 410 and 425. For example, the parameters applied at blocks 410 and 425 may be more restrictive than those applied at block 435, enabling the device 100 to determine dimensions at block 430 for objects with rounded or otherwise non-planar top surfaces at block 435. More restrictive plane detection parameters at blocks 410 and 425 may be more likely to lead to significant changes in detected planes as multipath artifacts change between point clouds.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a computing device, comprising:

capturing, via a depth sensor, a first point cloud depicting an object;

determining, from the first point cloud, a first attribute of a plane corresponding to a surface of the object;

monitoring, via a motion sensor, an orientation of the depth sensor;

in response to detecting a change in the orientation that meets a threshold, capturing a second point cloud depicting the object;

determining, from the second point cloud, a second attribute of the plane corresponding to the surface of the object;

determining whether the first attribute and the second attribute match; and when the first attribute and the second attribute match, dimensioning the object based on at least one of the first point cloud and the second point cloud;

wherein the first attribute and the second attribute include a dimension of the plane.

2. The method of claim 1, wherein the depth sensor includes a time-of-flight sensor.

3. The method of claim 1, wherein determining the first attribute includes determining an angle of orientation of the plane, and a dimension of the plane.

4. The method of claim 1, wherein detecting the change in the orientation includes:

determining, from motion data, (i) an initial angle of orientation associated with capture of the first point cloud, and (ii) a current angle of orientation; and determining whether a difference between the initial angle of orientation and the current angle of orientation meets the threshold.

5. The method of claim 1, further comprising:

prior to detecting a change in the orientation that meets a threshold, capturing a further point cloud; and discarding the further point cloud in response to determining that a change in the orientation does not meet the threshold.

6. The method of claim 1, wherein the first attribute and the second attribute include an angle of orientation of the plane.

7. The method of claim 1, further comprising:

when the first attribute and the second attribute do not match, repeating monitoring the orientation of the depth sensor, and in response to detecting a further change in the orientation, capturing a third point cloud depicting the object; determining, from the third point cloud, a third attribute corresponding to the plane of the object; and determining whether the second attribute and the third attribute match.

8. The method of claim 1, wherein determining whether the first attribute and the second attribute match comprises determining whether a difference between the first attribute and the second attribute is below a threshold.

9. The method of claim 1, further comprising:

presenting a prompt on a display to alter the orientation of the depth sensor.

10. The method of claim 1, further comprising:

prior to determining that the first attribute and the second attribute match, whether a timeout period has expired; and when the timeout period has expired, presenting an error notification.

11. A computing device, comprising:

a motion sensor;

a depth sensor; and a processor configured to:

capture, via the depth sensor, a first point cloud depicting an object;

determine, from the first point cloud, a first attribute of a plane corresponding to a surface of the object;

monitor, via the motion sensor, an orientation of the computing device;

in response to detecting a change in the orientation that meets a threshold, capturing a second point cloud depicting the object;

determine, from the second point cloud, a second attribute of the plane corresponding to the surface of the object;

determine whether the first attribute and the second attribute match; and when the first attribute and the second attribute match, dimension the object based on at least one of the first point cloud and the second point cloud wherein the first attribute and the second attribute include a dimension of the plane.

12. The computing device of claim 11, wherein the depth sensor includes a time-of-flight sensor.

13. The computing device of claim 11, wherein the processor is configured to determine an angle of orientation of the plane, and a dimension of the plane.

14. The computing device of claim 11, wherein the processor is configured to detect the change in the orientation by:

determining, from motion data, (i) an initial angle of orientation associated with capture of the first point cloud, and (ii) a current angle of orientation; and determining whether a difference between the initial angle of orientation and the current angle of orientation meets the threshold.

15. The computing device of claim 11, wherein the processor is further configured to:

prior to detecting a change in the orientation that meets a threshold, capture a further point cloud; and discard the further point cloud in response to determining that a change in the orientation does not meet the threshold.

16. The computing device of claim 11, wherein the first attribute and the second attribute include an angle of orientation of the plane.

17. The computing device of claim 11, wherein the processor is configured to:

when the first attribute and the second attribute do not match, repeat monitoring the orientation of the depth sensor, and in response to detecting a further change in the orientation, capturing a third point cloud depicting the object; determining, from the third point cloud, a third attribute corresponding to the plane of the object; and determine whether the second attribute and the third attribute match.

18. The computing device of claim 11, wherein the processor is configured to determine whether the first attribute and the second attribute match by determining whether a difference between the first attribute and the second attribute is below a threshold.

* * * * *